United States Patent
Huang et al.

(10) Patent No.: US 7,718,742 B2
(45) Date of Patent: May 18, 2010

(54) INDUSTRIAL SYNTHESES PROCESS OF HIGH TRAN-1, 4-POLYISOPRENE

(75) Inventors: Baochen Huang, Shandong (CN); Zhichao Zhao, Shandong (CN); Wei Yao, Shandong (CN); Aihua Du, Shandong (CN); Yongxian Zhao, Shandong (CN)

(73) Assignee: Qingdao Qust Fangtai Material Engineering Co., Ltd. (CN)

( * ) Notice: Subject to any disclaimer, the term of this patent is extended or adjusted under 35 U.S.C. 154(b) by 0 days.

(21) Appl. No.: 12/296,797

(22) PCT Filed: Apr. 2, 2007

(86) PCT No.: PCT/CN2007/001064

§ 371 (c)(1),
(2), (4) Date: Feb. 3, 2009

(87) PCT Pub. No.: WO2007/115486

PCT Pub. Date: Oct. 18, 2007

(65) Prior Publication Data

US 2009/0281257 A1 Nov. 12, 2009

(30) Foreign Application Priority Data

Apr. 11, 2006 (CN) .................... 2006 1 0043556

(51) Int. Cl.
  C08F 2/00 (2006.01)
  C08F 4/44 (2006.01)
  C08F 136/08 (2006.01)
  C08F 6/00 (2006.01)
  F26B 5/04 (2006.01)

(52) U.S. Cl. .............. 526/65; 526/88; 526/124.2; 526/340; 526/902; 526/904; 526/905; 528/501; 34/403; 34/404

(58) Field of Classification Search ................ 526/904; 528/501; 34/381, 403
See application file for complete search history.

(56) References Cited

U.S. PATENT DOCUMENTS 3,114,744 A * 12/1963 Lasky ..................... 526/116
4,388,447 A *  6/1983 Iwamoto et al. ......... 525/316

FOREIGN PATENT DOCUMENTS

| CN | 1117501 | * | 2/1996 |
| CN | 1425699 |   | 1/2003 |
| CN | 1565737 | * | 1/2005 |
| RU | 2196782 |   | 1/2003 |
| RU | 2196782 C2 | * | 1/2003 |

OTHER PUBLICATIONS

English abstract of CN 1565737.*

* cited by examiner

*Primary Examiner*—David Wu
*Assistant Examiner*—Elizabeth Eng
(74) *Attorney, Agent, or Firm*—Occhiuti Rohlicek & Tsao LLP

(57) ABSTRACT

A synthesis process of trans-1,4-polyisoprene, using bulk precipitation polymerization of isoprene catalyzed by supported titanium catalyst $TiCl_4/MgCl_2$. The process includes prepolymerizing carried out in a prepolymerization reactor with an anchor agitator; polymerizing carried out in a polymerization reactor with a helical ribbon agitator; and devolatilizing and drying carried out in a vacuum rake dryer. Not only does the process require lower energy consumption and thus a lower production cost, but it also eliminates the emission of three wastes.

17 Claims, 2 Drawing Sheets

FIGURE 2

A comparison table of the major physical and mechanical properties of the synthetic TPI of example 1

| Items | Reference value | Measurement value for TPI of the present process |
|---|---|---|
| Glossary | Brown or light milk yellow | White or light milk yellow |
| Relative density | 0.950 | 0.956 |
| Melting point (degrees Celsius) | 60 | 59-62 |
| Mooney viscosity | 30-25 | 20-90 (adjusted as requirements) |
| Hardness ( Shore A ) | 95 | 95 |
| Crystallinity (%) | 30-35 | 34 |
| Tensile Strength (MPa) | 35.2 | 36.7 |
| 300% Tensile Strength (MPa) | 17.6 | 22.5 |
| Elongation at Break (%) | 460-500 | 400 |

INDUSTRIAL SYNTHESES PROCESS OF HIGH TRAN-1, 4-POLYISOPRENE

CROSS-REFERENCE TO RELATED APPLICATIONS

This application is the National Stage of International Application No. PCT/CN2007/001064, filed on Apr. 2, 2007, which claims the benefit of Chinese Application Serial No. 200610043556.4, filed on Apr. 11, 2006. The contents of both of the foregoing applications are hereby incorporated by reference in their entirety.

FIELD OF THE INVENTION

The present application relates to the technical field of synthesis and application of organic polymer materials, more specifically, relates to the implement and improvement of an industrial synthesis process of high trans-1,4-polyisoprene (abbr. TPI).

BACKGROUND OF THE INVENTION

Trans-1,4-polyisoprene (TPI), which is also called synthetic Gutta percha, Gutta percha, Balata etc., is an isomer of universal natural rubber (NR) and isoprene rubber (IR). At room temperature, TPI has easy crystallinity and the melting point is merely about 60 degrees Celsius, so it can be used for medical fixed orthopedic materials and the like as a low melting point plastic. However, the TPI's molecular chain is essentially a flexible unsaturated chain containing carbon-carbon double bonds, thus it can be crosslinked by the same vulcanization method of unsaturated rubbers. If the crosslink density is lower, TPI is a thermotropic rubber elastomer, that is, it performs the elastomer feature over 60 degrees Celsius and crystallizates at room temperature, which can be used as shape memory functional materials; If the crosslink density is higher, TPI is turned into elastomer materials because crosslinking prevents crystallization. Such elastomer has advantageous characteristics as good dynamic performance, low heat-building, good fatigue tolerance, therefore it is a good material for manufacturing high performance tyres with green, energy saving and environmental conservation, and damping product of high speed trains and cars. So it can be seen that TPI is a plastic as well as a rubber, meanwhile it can be used as functional material, which is a new polymer material with a variety of applications.

*Eucommia ulmoides* Oliv. is a unique species in China, and the Gutta-percha can be extracted from the skin, leaves and seeds of *Eucommia ulmoides*. Ruifang Yan, researcher of Institute of Chemistry Chinese Academy of Sciences, has made a great deal of work on the development of Gutta-percha; the Gutta-percha which is also called Balata etc. has also been extracted from related plants. Because the contents are limited, and the extraction method is complicated, so the cost and price are high, and the applications are badly restricted.

The earliest patent for TPI synthesis was published in 1955 (British Patent Publication No. 834554 and Italian Patent Publication IT553904). From 1960s, Canada Polysar, UK Dunlop, Japan Kurary etc. successively built industrial devices for TPI synthesis, which are all small devices around several hundreds tons yearly. These devices all adopt a process of solution polymerization catalyzed by Vanadium catalyst system or Vanadium-Titanium mixed catalyst system, which is similar to the process of polybutadiene rubber. Due to the low catalysis activity (only 1-2 kg TPI/gV), complicated process, high energy and material consumption, small production scale, the cost of production is high. At present, the international market price of TPI is USD35/Kg, which is more than ten times higher than that of the ordinary rubber materials, thus very limits the market development of TPI to only special applications like medical materials etc. It is said that only a Japanese company is still producing TPI currently, which model is TP-301.

SUMMARY OF THE INVENTION

The present invention is aimed at providing a novel industrial synthesis process of high trans-1,4-polyisoprene to overcome the aforesaid defects and deficiencies. The process adopts bulk precipitation polymerization of isoprene catalyzed by supported titanium catalyst $TiCl_4/MgCl_2$, which is prior to the solution polymerization using Vanadium catalyst system. Its production cost is less than that of the foreign synthesis process of TPI, even lower than that of the synthesis of cis-isoprene rubber (IR) by process of solution polymerization which is commonly used in the world; the present process has high catalytic activity, simple processung, low energy and material consumption, and the production scale is arbitrary; all these create a favorable condition for the popularization and application of TPI, especially for its application in energy saving tyres and damping products of high speed cars and trains.

In order to achieve the above mentioned object, a process of bulk precipitation polymerization of isoprene catalyzed by supported titanium is catalyst $TiCl_4/MgCl_2$ is adopted by the present invention, including the steps of prepolymerizing, polymerizing, devolatilizing and drying etc. One $2M^3$ prepolymerization reactor with an anchor agitator, four $4M^3$ polymerization reactors with a helical ribbon agitator and one $5M^3$ vacuum rake dryer are selected respectively for the implement of the process. Since the time for prepolymerizing is short while the time for polymerizing is long, one prepolymerization reactor can cooperate with several polymerization reactors.

The step of prepolymerizing is carried out in the $2M^3$ prepolymerization reactor with an anchor agitator, wherein a monomer isoprene refined by distillation, dehydration and drying by molecular sieve is pumped into the prepolymerization reactor, 1.5-6.5 kg trialkyl aluminum and 0.2-0.8 kg supported titanium catalyst $TiCl_4/MgCl_2$ with titanium content of 2% are added sequentially to every 680 kg of isoprene, stirred fully at −10-10 degrees Celsius and prepolymerized for 0.5-1 hour to form polymer particles with catalyst core.

The optimal temperature for prepolymerizing is 0-5 degrees Celsius, and the optimal time is 0.5-1 hour.

For the step of polymerizing, the polymer mass obtained by prepolymerizing is fed into a $4M^3$ polymerization reactor with a helical ribbon agitator, and fresh monomer isoprene in the amount equal to that for prepolymerizing is added to polymerize at 10-40 degrees Celsius with full stirring. Hydrogen is used as chain transfer agent to regulate the molecular weight of the polymer, and the pressure of hydrogen is controlled at 0.005-0.10 MPa, the corresponding Mooney viscosity $ML_{3+4}^{100°\,C.}$ of the polymer is 90-10, which may be adjusted according to the requirements. For example, polymers with a Mooney viscosity $ML_{3+4}^{100°\,C.}$ of 90-60 are suited for tyres; polymers with a Mooney viscosity $ML_{3+4}^{100°\,C.}$ of 60-40 are suited for ordinary rubber products or shape memory materials; and polymers with a Mooney viscosity $ML_{3+4}^{100°\,C.}$ of 40-10 are suited for medical materials. The particles get larger and the conversion rate improves gradually as the time for polymerization prolongs. Generally, the time for polymerization is 24-72 hours. The yields of catalyst almost linearly increase with the prolonging of the time for polymerization till the monomer phase disappears. An increase in the time for polymerization can improve the yields of catalyst effectively, therefore, it is advantageous to select longer time for polymerization. When the conversion rate goes beyond 40%, that is, the liquid monomer disappears, the heat transfer gets difficult and the agitation power improves, the polymerization is terminated.

It is proper for the polymerizing temperature to be 20-25 degrees Celsius, and for the polymerizing time to be 48-60 hours.

For the step of devolatilizing and drying, the polymer mass of which the conversion rate is over 40% is fed into a $5M^3$ vacuum rake dryer, 10-13 kg stabilizer is added therein, the unpolymerized isoprene is removed under vacuum condition, the vacuum degree improves gradually as the monomer decreases gradually till the vacuum degree reaches over –0.05 MPa for 0.9-1.1 hours, nitrogen is pumped in and discharge is performed, high trans-1,4-polyisoprene products with volatiles less than 0.3% can be obtained as a powder. The removed isoprene monomer will be recycled for use after condensing, recovering, and returning back to prepolymerization reactor. Thus the overall conversion rate of the monomer can reach over 95%.

The heat supply for the step of devolatilizing and drying adopts the recovery of polymerization heat, that is, the recycle water of the refrigerator of the polymerization unit is adopted for the heat source to evaporate isoprene for energy saving.

The heat supply for the step of devolatilizing and drying adopts the recovery of polymerization heat, that is, the cooling water at the exit from the refrigerator of the polymerization unit, which reaches 30-40 degrees Celsius, is pumped in the jacket of the evaporator and rake dryer, which is used as the heat medium for the evaporator and rake dryer to recover the heat (the boiling point of isoprene is 34.1 degrees Celsius), so that the goal of energy saving is achieved.

The 0.5-1.5% non-polluted antioxidant 264, based on the amount of polymer, is used as the stabilizer added before devolatilizing and drying, which is added before the process of devolatilization and drying in the vacuum dryer. A stabilizer membrane is formed outside the polyisoprene powder by the solubility of the stabilizer in isoprene, so as to improve the stability of the product. This could improve the storage and application of the product. Generally, products without additional stabilizer get yellow in a month, while those with additional stabilizer will keep the white color within six months.

The project of the present invention is achieved as described above.

Compared with the industrial synthesis technologies of TPI in foreign countries and the current synthesis technologies of rubber by common solution method, the present invention has advantages as follows:

1. A simple process flow. The devices are highly integrated, wherein the major device for a 500 tons TPI/year occupies no more than 50 $M^2$.

2. A less investment on the devices. The overall investment is within half of the investment on the general synthesis rubber production, and the energy and material consumption can be reduced by about ⅔, which decrease the production cost significantly.

3. A high catalytic activity. Currently, the activity of catalyst has already reached over 50 kg TPI/gTi, which is about 30 times more than that of the vanadium catalyst system, the de-ashing process can be exempted (residual titanium amount is lower than 20 ppm). Since the isoprene monomer is oriently polymerized, the trans-1,4-structure in the product can also reach over 98%, meanwhile its quality and properties can reach or approach the level of the international similar products.

4. No waste pollution. Since no solvent is used in the polymerization, a large number of solvents as well as the recovery and refining of the solvents will be omitted. There is no emission of three wastes during the synthesis process, which is advantageous to the environment conservation.

5. An easy product separation. The polymerizing system is a suspension of the polymers in their monomer, of which the viscosity is low, therefore, the difficulties of heat transfer, mass transfer and power transfer as well as glue hanging induced by the high viscosity during the solution polymerization will be avoid. The distilled monomer can return back directly for application, and the final conversion rate can reach over 95%. The product is powder rubber which can be used directly.

The present invention adopts bulk precipitation polymerization of isoprene catalyzed by supported titanium catalyst, which is prior to solution polymerization using vanadium catalyst system. The production cost is less than that of the foreign synthesis process of TPI, even lower than that of the synthesis of cis-isoprene rubber (IR) by process of solution polymerization which is commonly used in the world; the present process has high catalytic activity, simple process, low energy and material consumption, and the production scale is arbitrary; all these create a favorable condition for the popularization and application of TPI, especially for its application in energy saving tyres and damping products of high speed trains and cars.

BRIEF DESCRIPTION OF DRAWINGS

FIG. 2 is a comparison table of the major physical and mechanical properties of the synthetic TPI of Example 1.

DETAIL DESCRIPTION OF THE INVENTION

Example 1

Figure 1:
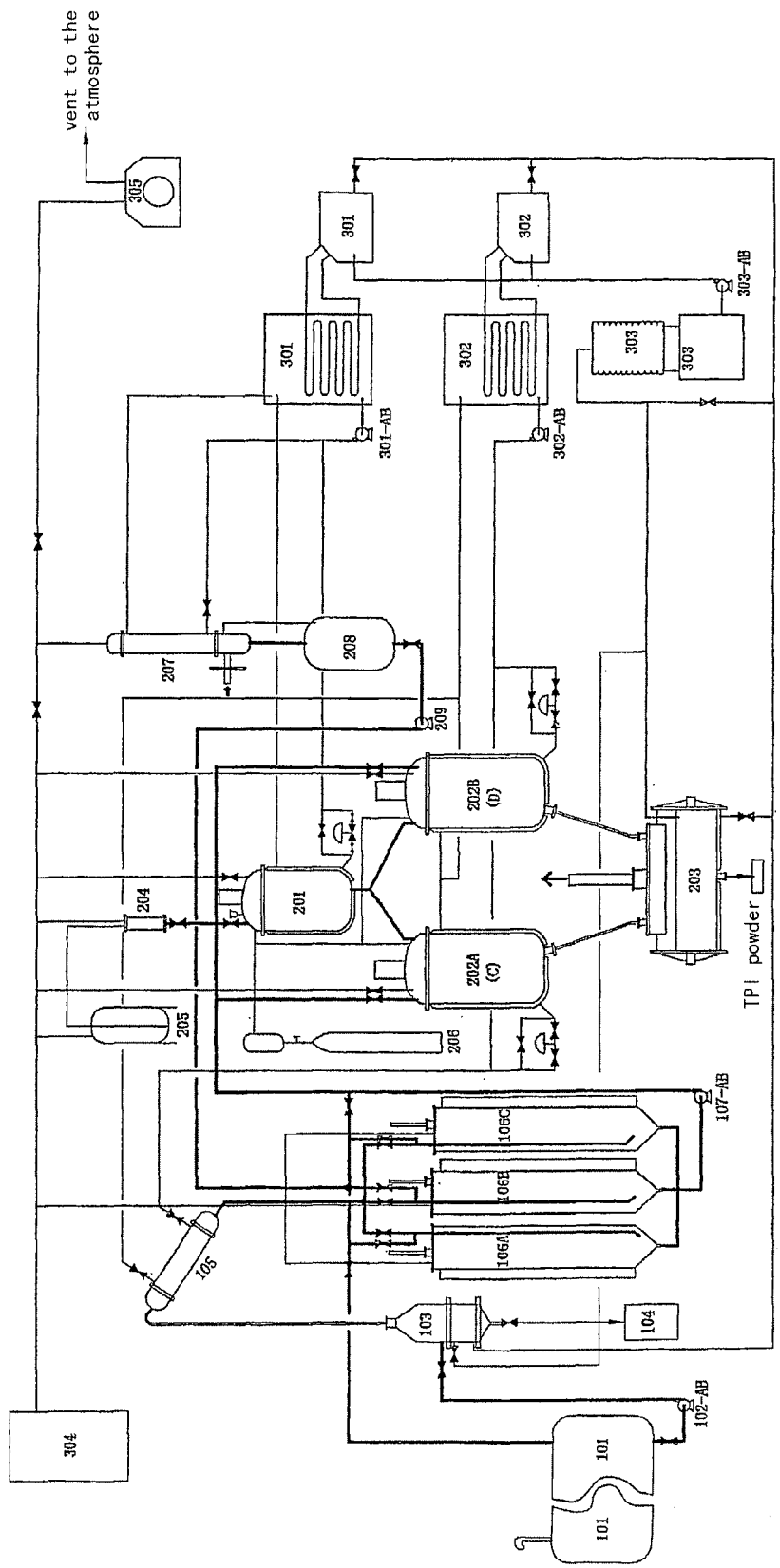
FIG. 1 is a process flow chart of the present invention.

An industrial synthesis process of high trans-1,4-polyisoprene, which process flow chart is shown in FIG. 1. In FIG. 1, it comprises monomer storage tank 101, monomer pump 102, monomer evaporator 103, residual oil can 104, condenser 105, monomer dehydrating measuring tank 106, monomer pump 107, prepolymerizaiton reactor 201, polymerizaiton reactor 202, vacuum rake dryer 203, A1 measuring tank 204, A1 storage tank 205, hydrogen cylinder and buffering tank 206, monomer recovery condenser 207, monomer recovery storage tank 208, monomer pump 209, chilled water unit 301, cooling water unit 302, cooling tower 303, PSA nitrogen generator 304, and vacuum pump 305. This example is an industrial production device with an annual production of 500 tons for TPI synthesis.

A process of bulk precipitation polymerization of isoprene catalyzed by supported titanium catalyst $TiCl_4/MgCl_2$ is adopted by the example, including the steps of prepolymerizing, polymerizing, devolatilizing and drying. The step of prepolymerizing is carried out in a $2M^3$ jacket reactor with an anchor agitator, the feed ratio is 6.5 kg triisobutyl aluminum and 0.7 kg supported titanium catalyst $TiCl_4/MgCl_2$ with titanium content of 2% per cubic meter (680 kg) isoprene; the step of polymerizing is carried out in a $4M^3$ jacket reactor with a helical ribbon agitator, and additional fresh isoprene in the amount equal to that for prepolymerizing is pumped into the polymerization reactor during the polymerizing; and the step of devolatilizing and drying is carried out in a 5M³ vacuum rake dryer, 10 kg stabilizer is added into the polymer before devolatilizing and drying.

The specific operation steps includes pumping polymer grade isoprene (purity>99.5%, boiling point of 34.1 degrees Celsius) to evaporator 103 from storage tank 101, evaporating it to remove inhibitor and high boiling point substance, and transferring the remainders to the molecular sieve of the dehydrating measuring tank 106 from condenser 105 to dry over 24 hours for further use.

The step of prepolymerizing is carried out in a prepolymerization reactor with anchor agitator. The monomer isoprene refined by distillation, dehydration and drying with molecular sieve is pumped into prepolymerization reactor 201, trialkyl aluminum and catalyst are added in the sequence of trialkyl aluminum and supported titanium catalyst. That is, the aforesaid quantity of dried isoprene are added into prepolymerization reactor 201, and cooled to about 0 degrees Celsius by water of −7 degrees Celsius in the jacket of the reactor, then 6.5 kg triisobutyl aluminum and 0.7 kg supported titanium catalyst are added, stirred fully at 5 degrees Celsius and prepolymerized for 0.5 hour to form polymer particles with catalyst core. Then the particles are fed into polymerization reactor 202.

For the step of polymerizing, the polymer mass obtained by prepolymerizing are fed into a polymerization reactor with a helical ribbon agitator, and fresh isoprene monomer which is equal amount to that in the prepolymerization is added and fully stirred for polymerizing, that is, additional fresh isoprene monomer in amount equal to that in the prepolymerization is pumped from 106. The polymerizing temperature is 20 degrees Celsius (adjusting the temperature using recycle water of 7 degrees Celsius in the jacket), and hydrogen is used as chain transfer agent to regulate the molecular weight of the polymer, the pressure of hydrogen is controlled at 0.017 MPa, and the time for polymerizing is 40 hours and then the polymerization is terminated.

For the step of devolatilizing and drying, the polymer mass are fed into vacuum rake dryer, and 10 kg stabilizer which is antioxidant 264 in this example, is added therein. The unpolymerized isoprene is then removed under vacuum condition, the vacuum degree improves gradually as the monomer decreases gradually till the vacuum degree reaches above −0.05 MPa for 1 hour, nitrogen is pumped in and discharge is performed, thus high trans-1,4-polyisoprene product with volatile less than 0.3% is obtained as powder. That is, when the agitation power increases obviously, air or quantitative water is pumped in to terminate the polymerization, the polymer are fed into vacuum rake dryer 203, and meanwhile the stabilizer is added. Pumping in warm water of about 35 degrees Celsius to the jacket of vacuum dryer, opening vacuum pump to vacuumize, evaporating the unreacted monomer into condenser 207, recovering by condensed water of −7 degrees Celsius for recycle use. The vacuum degree improves as the monomer decreases till the vacuum degree reaches above −0.05 MPa for 1 hour, pumping nitrogen in and discharging. TPI powder can be obtained according to the above feed ratio, wherein the Mooney viscosity $ML_{3+4}^{100° C.}$ of the product is 60.

The heat supply for monomer distillation in evaporator 103 and for devolatilizing and drying in vacuum rake dryer 203 adopt the recovery of polymerization heat, that is, the cooling water at the exit from a refrigerator of the polymerization unit, which reaches 30-40 degrees Celsius, is adopted as heat supply water for the evaporator and rake dryer to recover the heat.

Example 2

An industrial synthesis process of high trans-1,4-polyisoprene, wherein the step of prepolymerizing is carried out in a prepolymerization reactor with an anchor agitator. The monomer isoprene refined by distillation, dehydration and drying with molecular sieve is pumped into prepolymerization reactor 201, trialkyl aluminum and supported titanium catalyst are added sequentially. That is, the mass are added into prepolymerization reactor 201 in the ratio of 1.5 kg activator trialkyl aluminum and 0.2 kg supported titanium catalyst $TiCl_4$/$MgCl_2$ with titanium content of 2% per cubic meter (680 kg) isoprene. First, the dried isoprene is cooled to 0 degrees Celsius by water of −7 degrees Celsius, and then triisobutyl aluminum and supported titanium catalyst are added sequentially. Stirring fully at 10 degrees Celsius and prepolymerizing for 1 hour to form polymer particles with catalyst core. Then the particles are fed into polymerization reactor 202.

For the step of polymerizing, the polymer mass obtained by prepolymerizing are fed into a polymerization reactor with a helical ribbon agitator, and fresh isoprene monomer are added and fully stirred to polymerize, that is, fresh isoprene monomer in the amount equal to that for prepolymerizing is pumped from 106 for further polymerizing. The polymerizing temperature is 40 degrees Celsius (adjusting the temperature using recycle water of 7 degrees Celsius), and hydrogen is used as chain transfer agent to regulate the molecular weight of the polymer, the pressure of hydrogen is controlled at 0.10 MPa, and the time for polymerizing is 72 hours and then the polymerization is terminated.

For the step of devolatilizing and drying, the polymer mass are fed into vacuum rake dryer, and 13 kg antioxidant 264 as stabilizer is added therein. The unpolymerized isoprene is then removed under vacuum condition, the vacuum degree improves gradually as the monomer decreases gradually till the vacuum degree reaches above −0.05 MPa for 1.1 hours, nitrogen is pumped in and discharge is performed, and high trans-1,4-polyisoprene product with volatile less than 0.3% is obtained as powder. The Mooney viscosity $ML_{3+4}^{100° C.}$ of the product is 30.

Other procedures and parameters are the same as Example 1.

Example 3

An industrial synthesis process of high trans-1,4-polyisoprene, wherein the process of prepolymerizing is carried out in a prepolymerization reactor with an anchor agitator. The monomer isoprene refined by distillation, dehydration and drying with molecular sieve is pumped into prepolymerization reactor 201, trialkyl aluminum and supported titanium catalyst are added sequentially. That is, the mass are added into prepolymerization reactor 201 in the ratio of 6 kg activator trialkyl aluminum and 0.8 kg supported titanium catalyst $TiCl_4$/$MgCl_2$ with titanium content of 2% per cubic meter (680 kg) isoprene. First, the dried isoprene is cooled to 0 degrees Celsius by water of −7 degrees Celsius, and then triisobutyl aluminum and supported titanium catalyst are added sequentially. Stirring fully at 10 degrees Celsius and prepolymerizing for 0.8 hour to form polymer particles with catalyst core. Then the particles are fed into polymerization reactor 202.

For the step of polymerizing, the polymer mass obtained by prepolymerization are fed into a polymerization reactor with a helical ribbon agitator, and fresh isoprene monomer are added and fully stirred to polymerize, that is, fresh isoprene monomer in the amount equal to that for prepolymerizing is pumped from 106 for further polymerizing. The polymerizing temperature is 10 degrees Celsius (adjusting the temperature using recycle water of 7 degrees Celsius), and hydrogen is used as chain transfer agent to regulate the molecular weight of the polymer, the pressure of hydrogen is controlled at 0.005 MPa, and the time for polymerizing is 24 hours and then the polymerization is terminated.

For the step of devolatilizing and drying, the polymer mass is fed into vacuum rake dryer, and 11 kg stabilizer is added therein. The unpolymerized isoprene is then removed under vacuum condition, the vacuum degree improves gradually as the monomer decreases till the vacuum degree reaches above −0.05 MPa for 0.9 hour, nitrogen is pumped in and discharge is performed, and high trans-1,4-polyisoprene product with volatile less than 0.3% is obtained as powder. The Mooney viscosity $ML_{3+4}^{100°\,C.}$ of the product is 40.

Other procedures and parameters are the same as Example 1.

Example 4

An industrial synthesis process of high trans-1,4-polyisoprene, wherein the process of prepolymerization is carried out in a prepolymerization reactor with an anchor agitator. The monomer isoprene refined by distillation, dehydration and drying with molecular sieve is pumped into prepolymerization reactor 201, trialkyl aluminum and supported titanium catalyst are added sequentially. That is, the dried isoprene is added into prepolymerization reactor 201 and cooled to 0 degrees Celsius by water of −7 degrees Celsius, and then triisobutyl aluminum and supported titanium catalyst are added. Stirred fully at 4 degrees Celsius and prepolymerized for 1 hour to form polymer particles with catalyst core. Then the particles are fed into polymerization reactor 202.

For the step of polymerizing, the polymer mass obtained by prepolymerization are fed into a polymerization reactor with a helical ribbon agitator, and fresh isoprene monomer is added and fully stirred to polymerize, that is, fresh isoprene monomer in the amount equal to that for prepolymerizing is pumped from 106 to polymerization reactor. The polymerizing temperature is 22 degrees Celsius (adjusting the temperature using recycle water of 7 degrees Celsius), and hydrogen is used as chain transfer agent to regulate the molecular weight of the polymer, the pressure of hydrogen is controlled at 0.02 MPa, and the time for polymerizing is 60 hours and then the polymerization is terminated.

For the step of devolatilizing and drying, the polymer mass is fed into vacuum rake dryer, and stabilizer is added therein. The unpolymerized isoprene is then removed under vacuum condition, the vacuum degree improves gradually as the monomer decreases till the vacuum degree reaches above −0.05 MPa for 1 hour, nitrogen is pumped in and discharge is performed, and high trans-1,4-polyisoprene product with volatile less than 0.3% is obtained as powder. The Mooney viscosity $ML_{3+4}^{100°\,C.}$ of the product is 43.

The effect of Example 4 is the best.

Other procedures and parameters are the same as Example 1.

Examples 1-4 adopt bulk precipitation polymerization of isoprene catalyzed by supported titanium catalyst, which is prior to solution polymerization using vanadium catalyst system. The production cost of present process is less than that of the foreign synthesis process of TPI, even lower than that of the synthesis of cis-isoprene rubber (IR) by process of solution polymerization which is commonly used in the world; the present process has high catalytic activity, simple process, low energy and material consumption, and the production scale is arbitrary; all these create a favorable condition for the popularization and application of TPI, especially for its application in energy saving tyres and damping products of high speed trains and cars.

What is claimed is:

1. An industrial synthesis process of high trans-1,4-polyisoprene, wherein said process adopts a bulk precipitation polymerization of isoprene catalyzed by a supported titanium catalyst $TiCl_4/MgCl_2$, which includes the steps of prepolymerizing, polymerizing, devolatilizing and drying, wherein said steps are carried out in a prepolymerization reactor with an anchor agitator, a polymerization reactor with helical ribbon agitator and a vacuum rake dryer, respectively.

2. The industrial synthesis process of high trans-1,4-poly isoprene according to claim 1, wherein said step of prepolymerization carried out in a prepolymerization reactor with an anchor agitator comprises pumping an isoprene monomer by distillation, dehydration, and drying by a molecular sieve into the prepolymerization reactor, adding 1.5-6.5 kg trialkyl aluminum and 0.2-0.8 kg supported titanium catalyst $TiCl_4/MgCl_2$ with a titanium content of 2% sequentially to every 680 kg of isoprene, and stirring fully at −10-10 degrees Celsius and prepolymerizing for 0.5-1 hour to form polymer particles with catalyst core.

3. The industrial synthesis process of high trans-1,4-polyisoprene according to claim 2, wherein the optimal temperature of said prepolymerizating is 0-5 degrees Celsius, and the optimal time is 0.5-1 hour.

4. The industrial synthesis process of high trans-1,4-polyisoprene according to claim 1, wherein said step of polymerizing comprises feeding the polymer obtained by prepolymerization into the polymerization reactor with a helical ribbon agitator, adding fresh isoprene monomer in the amount equal to that in the prepolymerizing, polymerizing at 10-40 degrees Celsius with full stirring, using hydrogen as a chain transfer agent to regulate the molecular weight of the polymer, and controlling the pressure of hydrogen at 0.005-0.10 MPa, wherein the time for polymerizing is 24-72 hours, and terminating the polymerization when the conversion rate goes beyond 40%, that is when the liquid monomer disappears, the heat transfer gets difficult, and the agitation power increases.

5. The industrial synthesis process of high trans-1,4-polyisoprene according to claim 4, wherein the optimal temperature of said prepolymerizing is 20-25 degrees Celsius, and the time for said polymerizing is 24-72 hours.

6. The industrial synthesis process of high trans-1,4-polyisoprene according to claim 1, wherein said step of devolatilizing and drying, that is the step of evaporating to remove the unpolymerized monomer, is carried out in a vacuum rake dryer, and comprises feeding the polymer with a conversion rate of over 40% into a vacuum rake dryer, and adding 10-13 kg of a stabilizer.

7. The industrial synthesis process of high trans-1,4-polyisoprene according to claim 6, wherein said step of devolatilizing and drying polymer comprises removing unpolymerized isoprene under a vacuum condition, the condition having of a vacuum degree that improves gradually as monomer gradually decreases till the vacuum degree reaches over −0.05 Mpa for 0.9-1.1 hours, pumping nitrogen in and discharging, condensing the unpolymerized isoprene, and returning it for polymerization, wherein a high trans-1,4-polyisoprene product powder with volatiles of less than 0.3% is obtained.

8. The industrial synthesis process of high trans-1,4-polyisoprene according to claim 2, wherein the heat supply for said step of devolatilizing and drying adopts the recovery of polymerization heat, that is, recycle water from a refrigerator of the polymerization reactor is adopted as a heat source for evaporating isoprene for energy saving.

9. The industrial synthesis process of high trans-1,4-polyisoprene according to claim 8, wherein the heat supply for said step of devolatilizing and drying adopts the recovery of polymerization heat, that is, cooling water exiting the refrigerator of the polymerization reactor, which reaches 30-40 degrees Celsius, is pumped into the jacket of the evaporator and rake dryer as a heat medium.

10. The industrial synthesis process of high trans-1,4-polyisoprene according to claim 6, wherein said stabilizer is 0.5-1.5% of a non-polluted antioxidant 264, based on the amount of polymer, added before the step of devolatilizing and drying in the vacuum dryer, and formed as a stabilizer membrane outside the polyisopren powder by the solubility of the stabilizer in isoprene to improve the stability of the product.

11. The industrial synthesis process of high trans-1,4-polyisoprene according to claim 2, wherein said step of polymerizing comprises feeding the polymer obtained by prepolymerizing into polymerization reactor with a helical ribbon agitator, adding fresh isoprene monomer in the amount equal to that in the prepolymerizing, polymerizing at 10-40 degrees Celsius with full stirring, using hydrogen as a chain transfer agent to regulate the molecular weight of the polymer, and controlling the pressure of hydrogen at 0.005-0.10 MPa, wherein the time for polymerizing is 24-72 hours, and terminating the polymerization when the conversion rate goes beyond 40%, that is when the liquid monomer disappears, the heat transfer gets difficult, and the agitation power increases.

12. The industrial synthesis process of high trans-1,4-polyisoprene according to claim 11, wherein the optimal temperature of said prepolymerizing is 20-25 degrees Celsius, and the time for said polymerizing is 24-72 hours.

13. The industrial synthesis process of high trans-1,4-polyisoprene according to claim 4, wherein said step of devolatilizing and drying, that is the step of evaporating to remove the unpolymerized monomer, is carried out in a vacuum rake dryer, and comprises feeding the polymer with a conversion rate of over 40% into a vacuum rake dryer, and adding 10-13 kg of a stabilizer.

14. The industrial synthesis process of high trans-1,4-polyisoprene according to claim 13, wherein said step of devolatilizing and drying the polymer comprises removing unpolymerized isoprene under a vacuum condition, the condition having of a vacuum degree that improves gradually as monomer gradually decreases till the vacuum degree reaches over −0.05 Mpa for 0.9-1.1 hours, pumping nitrogen in and discharging, condensing the unpolymerized isoprene, and returning it for polymerization, wherein a high trans-1,4-polyisoprene product powder with volatiles of less than 0.3% is obtained.

15. The industrial synthesis process of high trans-1,4-polyisoprene according to claim 6, wherein the heat supply for said step of devolatilizing and drying adopts the recovery of polymerization heat, that is, the recycle water from a refrigerator of the polymerization reactor is adopted as a heat source for evaporating isoprene for energy saving.

16. The industrial synthesis process of high trans-1,4-polyisoprene according to claim 15, wherein the heat supply for said step of devolatilizing and drying adopts the recovery of polymerization heat, that is, cooling water exiting the refrigerator of the polymerization reactor, which reaches 30-40 degrees Celsius, is pumped into the jacket of the evaporator and rake dryer as a heat medium.

17. The industrial synthesis process of high trans-1,4-polyisoprene according to claim 13, wherein said stabilizer is 0.5-1.5% of a non-polluted antioxidant 264, based on the amount of polymer, added before the step of devolatilizing and drying in the vacuum dryer, and formed as a stabilizer membrane outside the polyisoprene powder by the solubility of the stabilizer in isoprene to improve the stability of the product.

\* \* \* \* \*